United States Patent
Kumar et al.

(10) Patent No.: US 10,609,152 B2
(45) Date of Patent: Mar. 31, 2020

(54) CREATION OF REMOTE DIRECT ACCESS PATH VIA INTERNET TO FIREWALLED DEVICE USING MULTI-SITE SESSION FORWARDING

(71) Applicant: Cisco Technology, Inc., San Jose, CA (US)

(72) Inventors: Rajesh Kumar, Palo Alto, CA (US); Alex V. Truong, San Jose, CA (US); Erik J. Burgess, San Francisco, CA (US); Swapnil A. Pathrikar, San Ramon, CA (US); Ashok V. Iyer, Brevard, NC (US)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 15/646,798

(22) Filed: Jul. 11, 2017

(65) Prior Publication Data
US 2019/0020723 A1 Jan. 17, 2019

(51) Int. Cl.
*H04L 29/08* (2006.01)
*H04L 12/46* (2006.01)
*H04L 29/06* (2006.01)

(52) U.S. Cl.
CPC ........ *H04L 67/141* (2013.01); *H04L 12/4633* (2013.01); *H04L 63/029* (2013.01);
(Continued)

(58) Field of Classification Search
None
See application file for complete search history.

(56) References Cited

U.S. PATENT DOCUMENTS 6,061,797 A 5/2000 Jade et al.
9,231,918 B2 1/2016 Khan et al.
(Continued)

FOREIGN PATENT DOCUMENTS

EP 3056993 A1 8/2016

OTHER PUBLICATIONS

International Search Report and Written Opinion in counterpart International Application No. PCT/US2018/040973, dated Sep. 17, 2018, 9 pages.

(Continued)

*Primary Examiner* — Cai Y Chen
(74) *Attorney, Agent, or Firm* — Edell, Shapiro & Finnan, LLC

(57) ABSTRACT

A cloud proxy communicates over a public network with a network proxy in a private network. The network proxy communicates with the public network through a firewall. The cloud proxy receives from a requester a request to communicate with a remote device in the private network. The cloud proxy creates first forwarding rules to forward traffic from the requester to the network proxy and from the network proxy to the requester. The cloud proxy sends the request to the network proxy, which causes the network proxy to create second forwarding rules to forward traffic from the network proxy to the remote device and from the remote device to the cloud proxy. A communication tunnel through the firewall device between the cloud proxy and the network proxy is established over which the southbound and northbound traffic is forwarded based on the first forwarding rules and the second forwarding rules.

20 Claims, 8 Drawing Sheets

(52) U.S. Cl.
CPC ...... *H04L 63/0272* (2013.01); *H04L 63/0281* (2013.01); *H04L 63/08* (2013.01); *H04L 63/20* (2013.01); *H04L 63/205* (2013.01); *H04L 67/28* (2013.01); *H04L 63/0892* (2013.01); *H04L 67/10* (2013.01); *H04L 69/16* (2013.01)

(56) References Cited

U.S. PATENT DOCUMENTS

| | | | |
|---|---|---|---|
| 10,038,721 B2* | 7/2018 | Overby, Jr. | H04L 63/20 |
| 2007/0061460 A1 | 3/2007 | Khan et al. | |
| 2014/0108084 A1* | 4/2014 | Bargetzi | G06Q 10/1095 705/7.19 |
| 2014/0126708 A1* | 5/2014 | Sayko | H04M 11/00 379/93.01 |
| 2014/0165142 A1 | 6/2014 | Lee et al. | |
| 2014/0237585 A1 | 8/2014 | Khan et al. | |
| 2015/0334192 A1* | 11/2015 | Fontaine | H04L 67/14 709/203 |
| 2015/0350377 A1 | 12/2015 | Iyer et al. | |
| 2016/0241633 A1 | 8/2016 | Overby, Jr. et al. | |

OTHER PUBLICATIONS

"LogMeIn Pro User Guide—How to Set Remote Control Permission Defaults (Host-side User's Consent)", https://documentation.logmein.com/webhelp/EN/Pro/LogMeIn/t_host_preferences_consent_userpresent.html, downloaded from the internet on May 14, 2019, 3 pages.

Wikipedia page, "LogMeIn", https://en.wikipedia.org/wiki/LogMeIn, downloaded form the internet on May 14, 2019, 5 pages.

\* cited by examiner

CREATION OF REMOTE DIRECT ACCESS PATH VIA INTERNET TO FIREWALLED DEVICE USING MULTI-SITE SESSION FORWARDING

TECHNICAL FIELD

The present disclosure relates to remote device access.

BACKGROUND

For data communication and sensor networks, user devices typically need to login via the Internet to remote devices in private customer network for customer support or for troubleshooting. The user device, or their users, may or may not belong to an organization that owns or manages the customer network. While such remote access is possible when the user device (i.e., requester device) has virtual private network (VPN) access to the customer network, this may not always be possible for reasons of security policy, infrastructure costs, administrative cost and/or logistics. Other methods such as deploying Hypertext Transfer Protocol Secure (HTTPS) or Secure Socket Shell (SSH) proxies in the customer network run into similar problems including high administrative costs for granting and revoking secure access manually via these proxies, and complex infrastructure deployment.

DESCRIPTION OF EXAMPLE EMBODIMENTS

Overview

Figure 1:
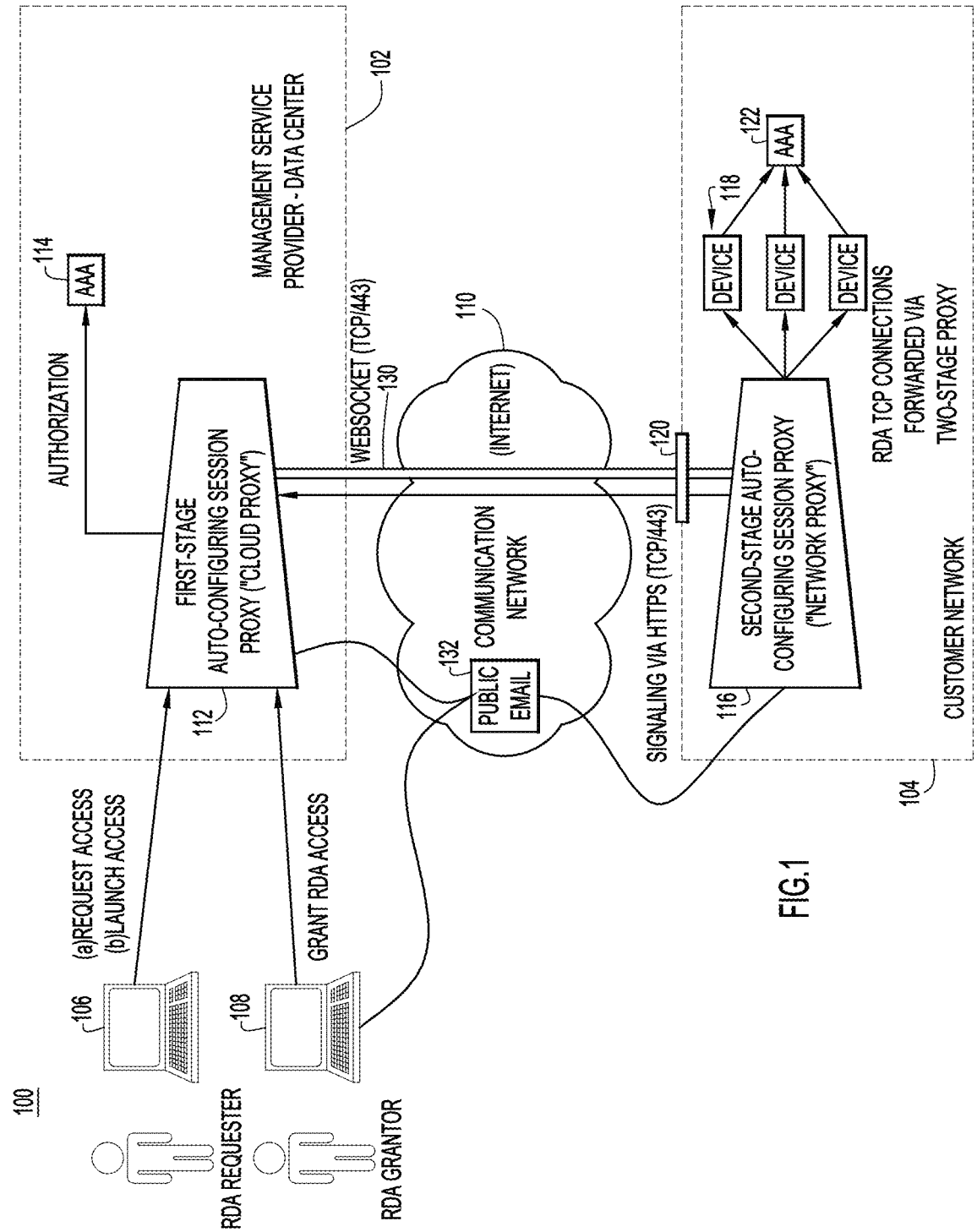
FIG. 1 is a block diagram of a network environment for implementing remote direct access (RDA) between user devices, i.e., establishing an authorized RDA session in which the user device communicate with each other based on dynamic forwarding rules, according to an example embodiment.

A cloud proxy device is configured to communicate over a public network with a network proxy device in a private network. The network proxy is configured to communicate with the public network through a firewall device. The cloud proxy device receives from a requester device over the public network a request to establish a bidirectional communication session with a remote device in the private network. The request includes identifiers for the requester device and the remote device. Responsive to the request, the cloud proxy device creates on the cloud proxy device first forwarding rules to be used during the communication session to forward southbound traffic from the requester device to the network proxy device and northbound traffic from the network proxy device to the requester device. The cloud proxy device sends the request to the network proxy device over the public network. The request is configured to cause the network proxy device to create second forwarding rules to forward the southbound traffic from the network proxy device to the remote device and the northbound traffic from the remote device to the cloud proxy device. A communication tunnel through the firewall device between the cloud proxy device and the network proxy device is established over which the southbound traffic and the northbound traffic are forwarded based on the first forwarding rules and the second forwarding rules in support of end-to-end communication between the requester device and the remote device.

Example Embodiments

Conventional techniques used for remote direct access (RDA) from a requester device to a remote device (also referred to as an "end device") have several drawbacks. For example, VPNs may be used for remote access; however, offering VPN access to personnel outside an organization is too open-ended and fraught with security and liability concerns, not to mention administrative complexity and cost that often puts it out of reach for small businesses. Similar concerns apply to hosting an HTTPS/SSH forwarding proxy at a customer network even if this proxy is limited to remote device access (as opposed to open-ended VPN). In that case, access permissions and forwarding rules need to be managed manually by a customer, negatively impacting operational costs. Existing proxy signaling techniques, such as Socket Secure (SOCKS), do not address the full scope of needs of RDA, such as session initiation over the Internet and time-limiting activation of forwarding rules and secured access for only an authorized lifetime of an RDA session. Also, the conventional techniques do not address the possibility of scaling-up RDA availability and usage.

Embodiments presented herein for implementing RDA overcome the above-mentioned drawbacks of the conventional techniques. The embodiments create an on-demand, ad-hoc, RDA session to connect, over a public network, a requester device to a remote device (i.e., an "end device") connected in a private network. The embodiments implement an end-to-end connection (i.e., from the requester device to the remote device) over which traffic is forwarded between the requester and remote device, and define security permissions in a "clean" manner that avoids "clutter" in various network devices used to implement the end-to-end connection. The RDA does not extend beyond a lifetime of the RDA session, thereby reducing unauthorized access and security concerns. Moreover, the embodiments advantageously provide easy scaling-up of RDA availability and usage by consolidating RDA provisioning and control as a multi-tenant, cloud-based service (such as a Software-as-a-Service).

With reference to FIG. 1, there is an example network environment 100 in which embodiments directed to implementing RDA may be implemented. Network environment 100 includes a data center 102 owned and operated by a management service provider, a customer network 104 (also referred to herein as a "private network") operated by a customer enterprise, a user device 106 (also referred to as an "RDA requester," or more simply a "requester") operated by a local user, an RDA grantor device 108 (also referred to simply as an "RDA grantor" or "grantor device") each configured to connect/communicate with a communication network 110. Communication network 110 includes one or more public wide area networks (WANs), such as the Internet, and may also include one or more local area networks (LANs). User device 106 may take on a variety of forms, including a landline telephone, a SmartPhone, a tablet, a laptop computer, a desktop computer, a video conference endpoint device, and the like. Only one user device 106 is shown in FIG. 1; however, it is understood that network environment 100 may include any number of such user devices. RDA grantor 108 may be a user device or a server that hosts an application configured to perform the operations of the RDA grantor described in detail below. RDA grantor 108 may represent an owner or network administrator of customer network 104.

Data center 102 includes a first-stage session auto-configuring proxy device 112 (also referred to as a "cloud proxy" 112) publically accessible via the Internet and configured to implement techniques presented herein. Cloud proxy 112 may include an application or service hosted on one or more servers included in data center 102. Cloud proxy 112 may be provided in the context of an RDA SaaS in data center 102, i.e., the cloud proxy may be implemented as an RDA SaaS application. Data center 102 may also include, or otherwise provide access to, an authentication, authorization, and accounting (AAA) server 114 employed by cloud proxy 112 to authenticate and authorize access by user device 106 to the cloud proxy, and ultimately to customer network 104.

Customer network 104 includes a second-stage auto-configuring session proxy device 116 (also referred to simply as "network proxy" 116) to cooperate with cloud proxy 112 to implement RDA as described herein. Network proxy 116 may be an application or service hosted on a network device, such as a network router or switch. For example, network proxy 116 may include an application hosted on a gateway router. Customer network 104 also includes multiple user devices 118 (also referred to as "remote devices") operated by local users and configured to connect to and communicate with the network proxy. User devices 118 are referred to collectively as user/remote devices 118, on singularly as a user/remote device 118. User devices 118 may be configured similarly to user device 106. Customer network 104 also includes a network security device 120 through which network proxy 116 accesses, or is accessed by, communication network 110. Network security device 120 may include a firewall device (more simply referred to as a "firewall"), for example, to monitor and control southbound traffic from communication network 110 and intended for the devices connected to customer network 104 (e.g., network proxy 116 and user devices 118), and northbound traffic originating in the customer network and intended for communication network 110, based on predetermined security rules implemented in the network security device. Thus, customer network 104 operates as a private network. Customer network 104 may also include, or otherwise provide access to, an AAA server 122 employed for authenticating user devices 118.

Cloud proxy 112 and network proxy 116 each have unique identifiers that may be used to access/communicate with the corresponding one of the cloud proxy and the network proxy. For example, cloud proxy 112 and network proxy 116 may each be identifiable/accessible by one or more of an Internet Protocol (IP) address and Transmission Control Protocol (TCP)/IP port, an email address, an Instant Messaging (IM) identity, a Uniform Resource Locator (URL), Uniform Resource Identifier (URI), and so on. A priori provisioning processes applied to cloud proxy 112 and network proxy 116, such as fulfilling a service subscription or performing a service registration, may be used to associate identities of the cloud proxy with identities of the network proxy. That is, the provisioning processes store the unique identifiers for cloud proxy 112 with network proxy 116, and store the unique identifiers of the network proxy with the cloud proxy. As a result, cloud proxy 112 and network proxy 116 are each mutually aware of the unique identifiers of the other, and can use them to communicate with/signal each other. For example, cloud proxy 112 and network proxy 116 may communicate with each other via email as shown at 132 in FIG. 1, IM, via the WebSocket protocol, and so on. WebSocket is a computer communications protocol that enables full-duplex communication channels over a single TCP connection. The WebSocket protocol is standardized by the IETF as RFC 6455.

Moreover, mutual identification between cloud proxy 112 and network proxy 116 may be provided, for example, via SSL certificates used to digitally sign messages exchanged between the two proxies. The example of FIG. 1 shows only one network proxy by way of example; however, it is understood that cloud proxy 112 may be a multi-tenant cloud proxy that associates with multiple single-tenant network proxies (each similar to network proxy 116) using the above-described provisioning processes.

In addition, cloud proxy 112 can associate network proxy 116 with specific user credentials for user device 106 (and other user devices), such as a user/customer identifier associated with the user of user device 106, and access AAA server 114 to determine whether the user credentials authorize the user of user device 106 to view remote devices 118 in customer network 104, e.g., in a list of authorized remote devices, and to launch RDA access to those remote devices, as described below. The method for the prior acquisition of list of authorized remote device may entail a manual transfer of a seed file, or an automatic discovery task that is run by a collateral process or system, or some other scheme, for remote devices 118 to self-report their presence, which is then vetted against service entitlement subscriptions and policies.

According to the embodiments presented herein, cloud proxy 112, RDA grantor 108, and network proxy 116 cooperate with each other to provide a "low-touch," "end-to-end" solution for establishing an RDA communication path from RDA requester 106 through firewall 120 to one of remote devices 118 that uses a dynamic WebSocket 130 across communication network 106 (e.g., the Internet), such that requirements for user device (i.e., RDA requester 106 and remote devices 118) authorization and network security concerns are met. Cloud proxy 112 and network proxy 116 together represent a two-stage session proxy that implements the solution. The solution is "end-to-end" meaning that it provides direct communication between RDA requester 106 and remote device 118, and "low touch" meaning that the solution minimizes the need for manual user interaction at both the RDA requester and the remote device for setting-up the RDA.

In the absence of an available WebSocket (such as WebSocket 130 or a WebSocket for another RDA that may be used for the present RDA), the embodiments use secure out-of-band signaling between proxies 112 and 116 (e.g., email from cloud proxy 112 to network proxy 116 or HTTPS polling messages from network proxy 116 to cloud proxy 112) to automate the process of establishing the RDA. The out-of-band signaling may traverse firewall 120 or some other customer firewall to reach proxy 116 over the internet. If WebSocket 130 already exists for another RDA, then WebSocket text frames may be used for inband signaling to automate the process of establishing the RDA. Besides signaling, WebSocket 130 is used for forwarding traffic between RDA requester 106 and a connected remote device 118 during an authorized RDA session. The embodiments automatically create session forwarding rules/mappings and TCP/IP port assignments in cloud proxy 112 and network proxy 116 to forward the traffic over WebSocket 130 during the session and which are active only during a session time window for an authorized session. A management entity, such as a network administrator, may set the time window and can revoke authorization to the authorized session in real time, i.e., at any time during the session.

Figure 2A:
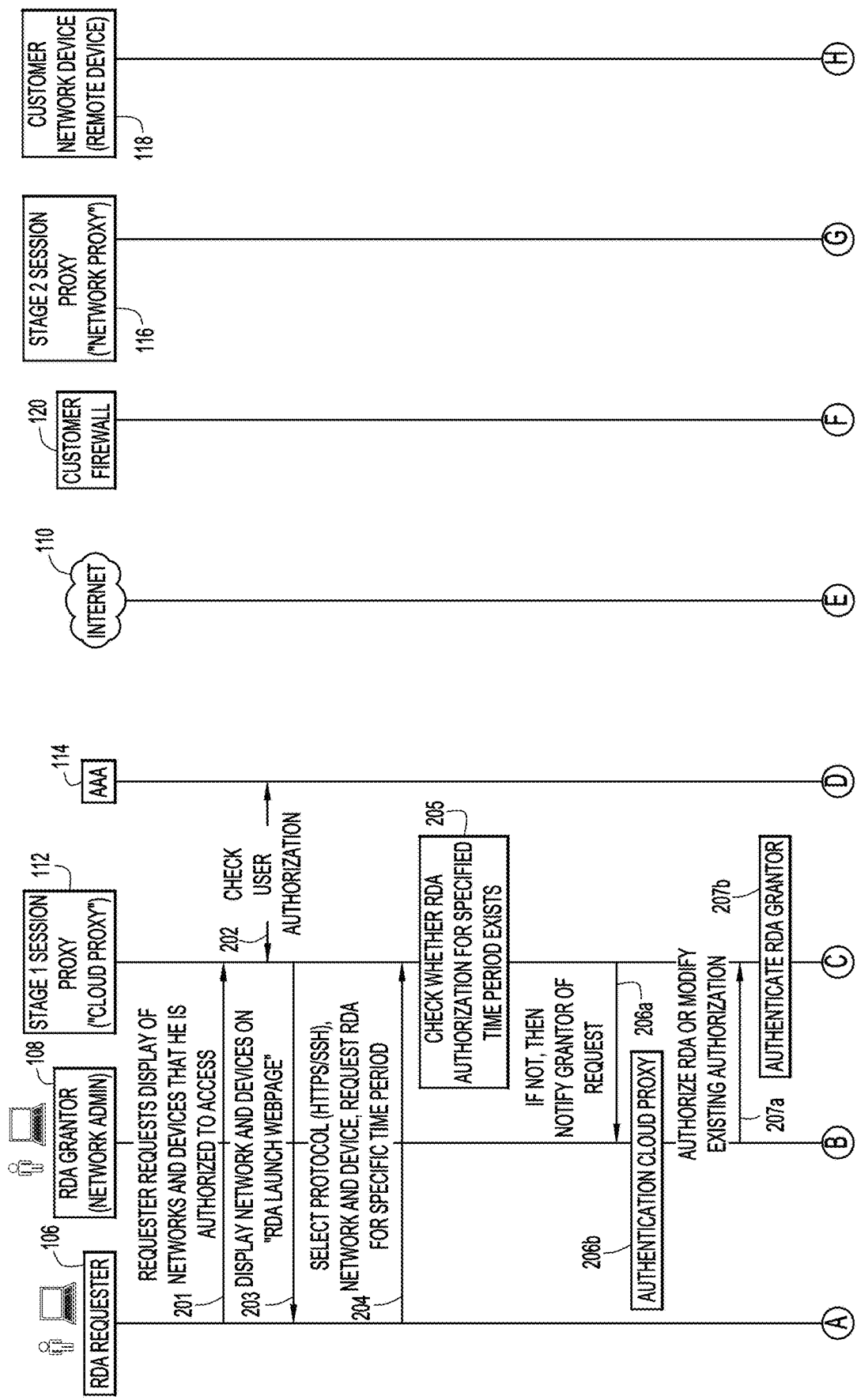
FIGS. 2A-2C depict a transaction diagram for establishing the RDA session, including setting-up an RDA path between the user devices based on dynamic traffic/packet forwarding rules, according to an example embodiment.
Figure 2B:
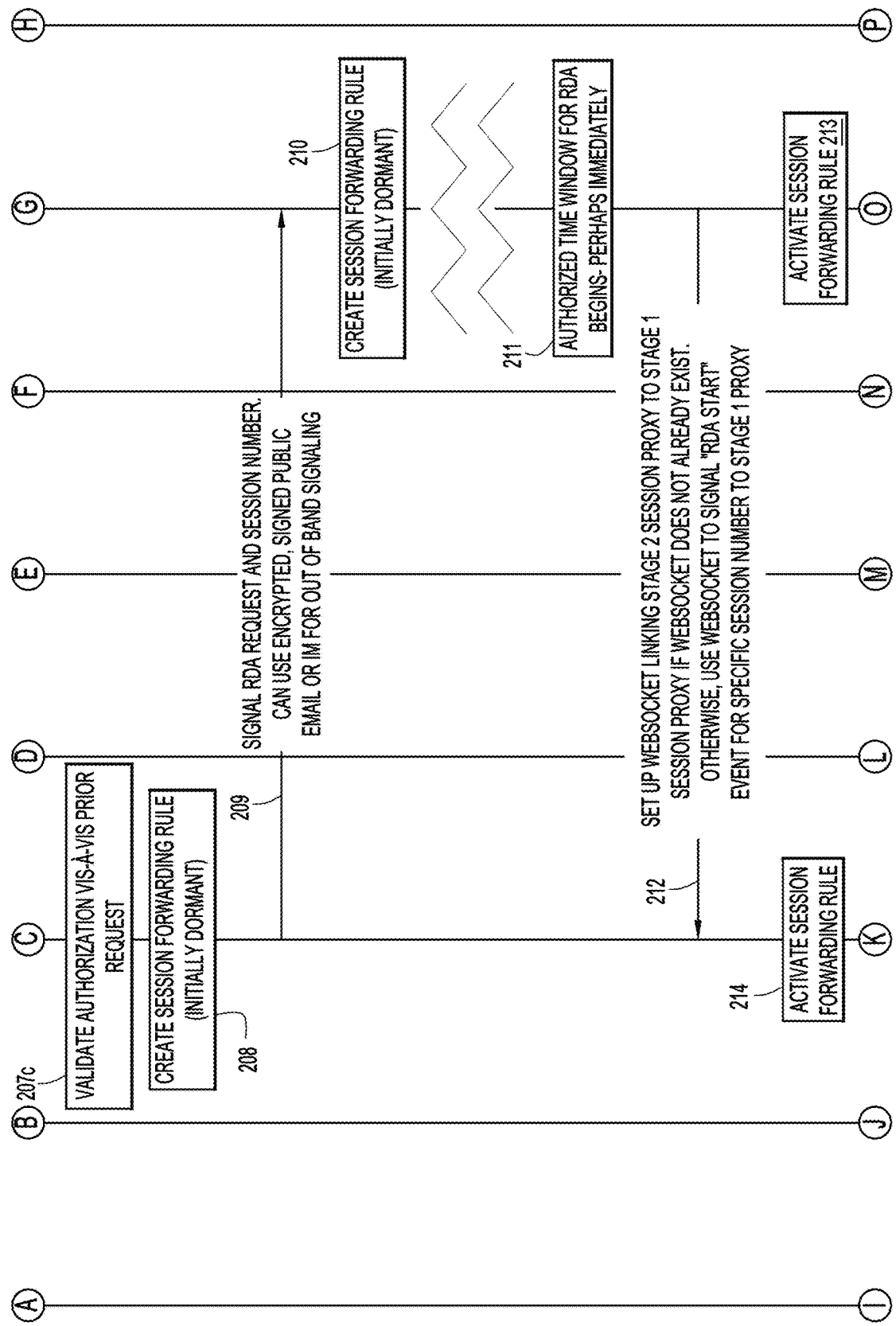
Figure 2C:
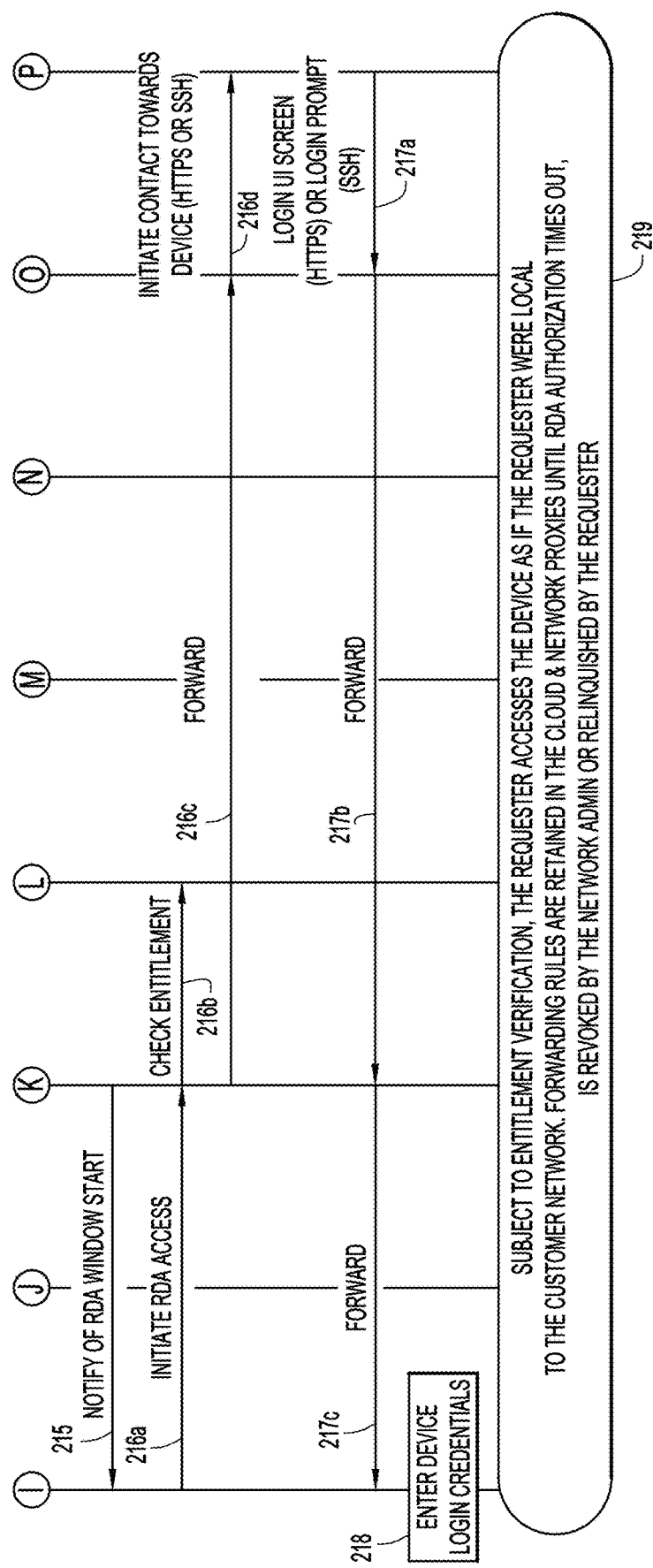

With reference to FIGS. 2A-2C, there is an example transaction diagram for establishing an RDA session/setting-up an RDA path between RDA requester 106 and one of remote devices 118 based on dynamic traffic/packet forwarding rules.

At 201, the user of RDA requester 106 enters user credentials into the RDA requester, commands the RDA requester to perform a login to cloud proxy 112 using the entered credentials, and request a list of the customer networks that the user is authorized to access. RDA requester 106 sends the login request with the entered user credentials to cloud proxy 112, which receives the login request. For convenience, the ensuring description refers to RDA requester 106 and the user of the RDA requester collectively as "RDA requester" 106, unless otherwise noted. RDA requester 106 may or may not belong to the organization that owns a specific network, such as customer network 104.

At 202, responsive to the login request, cloud proxy 112 accesses AAA server 114 (which has access to service entitlements for authorized users for cloud proxy 112) for verification that RDA requester 106 is authorized for cloud proxy 112. It is assumed here that AAA server 114 verifies to cloud proxy 106 that RDA requester 106 is authorized for access to cloud proxy 112.

At 203, responsive to the verification from AAA server 114, cloud proxy 112 accesses from a database stored with the cloud proxy information detailing which customer networks (e.g., customer network 104) and which remote devices (e.g., remote devices 118) RDA requester 106 is permitted to access, i.e., are available to the RDA requester. Cloud proxy 112 sends a message to RDA requester 106 to cause the RDA requester to display a webpage listing the available customer networks and remote devices as selectable options.

At 204, the user of RDA requester 106 selects from the webpage an available customer network (e.g., customer network 104) and an available remote device (e.g., one of remote devices 118). In response, RDA requester sends to cloud proxy 112 a message that requests RDA access (referred to as an "RDA access request" or simply an "RDA request") to the selected remote device. The RDA request includes parameters (i.e., RDA request parameters) such as a session number identifying this RDA session, a session time period/window including a start time and a stop time (which may be indefinite, i.e., for perpetuity), a specific communication protocol to be used (e.g., SSH, HTTPS), and device identifications/identifiers for RDA requester 106 and remote device 118 (e.g. IP addresses, URLs/UNIs, including Domain Name System (DNS)-resolvable host names, ports, and the like). It is understood that the RDA request may include DNS-resolvable host names of RDA requester 106 and remote device 118 rather than their IP addresses if data privacy policies preclude exposing these IP addresses to entities outside the relevant network such as a network including cloud proxy 112. Cloud proxy 112 receives the RDA request send from RDA requester 106.

At 205, in response to receiving the RDA request, since the RDA request may represent a repeat request for RDA access from RDA requester 106, cloud proxy 112 checks whether authorization for this RDA access already exists.

At 206a, if authorization for this RDA access does not already exist, cloud proxy 112 sends to RDA grantor 108 (e.g., a network administrator) a message conveying the RDA request. Cloud proxy 112 may send the message via an on-line notification, a secure email message, a secure text message or any combination of these communication techniques. At 206b, RDA grantor 108 authenticates cloud proxy 112, and may reject or approve the RDA request. This rejection or approval is conveyed by a means similar to that used for sending the request. That is, RDA grantor 108 authenticates/authorizes the RDA request. In this example, it is assumed that RDA grantor 108 approves/authorizes the RDA request.

At 207a, RDA grantor 108 sends to cloud proxy 112 a message authorizing/approving the RDA request, and may provide a modification to the RDA request, e.g., may provide a different session time window. Cloud proxy 112 receives the message sent at 207a. At 207b, responsive to receiving the message sent at 207a, cloud proxy 112 authenticates RDA grantor 108, e.g., authenticates a signature of the RDA grantor as seen in the message from 207a. At 207c, cloud proxy 112 may validate the authorization by way of an earlier request, e.g., authenticate a signature of the cloud proxy included in the earlier request.

As an aside, in support of the above-described operations 206a-206b and 207a-207c, RDA requestor 106 and RDA grantor 108 register with cloud proxy 112 a priori. Such registration may include an off-line verification of identity, which can be positively identified later as having the authority to request an RDA access or allow an RDA access into a specific customer network. Such "user onboarding" is a secure process. As a result, RDA requestors and RDA grantors can verify each other's identities via public key infrastructure (PKI) signing, for example. As described above, RDA grantor 108 authenticates the RDA request at 206b. Additionally, cloud proxy 112 authenticates the signature of the RDA grantor 108 at 207b, and authenticates the signature of the cloud proxy embedded in the original RDA request at 207c. If the RDA request is conveyed via secure email or via a secure text message, then the RDA request is first authenticated by RDA grantor 108 at 206b. An authenticated RDA request can launch a screen on an SaaS portal with inbuilt authentication not only of the RDA grantor's signature (as performed at 207b) but also of the cloud proxy's signature embedded in the original RDA authorization request (as performed at 207c).

At 208, responsive to successful authorization and authentications at 206a-206b and 207a-207c, cloud proxy 112 creates and stores in the cloud proxy session forwarding rules (referred to simply as "forwarding rules") to be used during the RDA session. The forwarding rules include forwarding rules to forward southbound traffic (destined for remote device 118) from RDA requester 106 to network proxy 116, and forward northbound traffic (originating at the remote device) from the network proxy to the RDA requester. The forwarding rules are used for session forwarding and not TCP forwarding. Cloud proxy 112 creates the forwarding rules in an initially inactive or dormant state in which the inactive/dormant forwarding rules are unable to be used to forward any traffic.

The forwarding rules have the following attributes: (1) when activated, traffic forwarding is to be done on the basis of "tun number" and "session number" as opposed to normal IP routing; and (2) the forwarding rules are established tentatively and are activated only at a designated moment at a start time of the session time window.

At 209, cloud proxy 112 sends to network proxy 116 a message including the parameters contained in the RDA request received at 209. In other words, cloud proxy 112 signals the RDA request to network proxy 116. Cloud proxy 112 communicates the parameters to network proxy 116 via signaling across network 110. If WebSocket 130 already exists for another RDA, then WebSocket text frames may be used for inband signaling to communicate the parameters in the RDA request. In the absence of WebSocket 130, secure out-of-band signaling is used for communicating these parameters between proxies 112 and 116 (e.g., email from cloud proxy 112 to network proxy 116 or HTTPS polling messages from network proxy 116 to cloud proxy 112). The out-of-band signaling may traverse firewall 120 or some other customer firewall to reach proxy 116 over the internet. As mentioned, for the secure for out-of-band signaling, encrypted emails with digital PKI signatures can be used; polling may be used; and a persistent connection between cloud proxy 112 and network proxy 116 may be used. Free public webmail services such as Gmail and Hotmail are interoperable and support encryption and return receipts. SSL certificates for signing are provided during the a priori binding of network proxy 116 to cloud proxy 112, e.g., during provisioning as described above. Alternatively, network proxy 116 may use polling to discover a pending RDA request at cloud proxy 112. With polling, network proxy 116 polls cloud proxy 112 periodically, and the cloud proxy sends any pending RDA request in a polling response. This is just one method for the cloud proxy to convey information to the network proxy. Network proxy 116 receives the message sent by cloud proxy 112 by way of the signaling, which is out-of-band in the absence of WebSocket 130.

At 210, upon receiving the RDA request signaled at 209, network proxy 116 creates session forwarding rules at the network proxy. The forwarding rules include forwarding rules to forward southbound traffic (originating at RDA requester 106) from network proxy 116 to the remote device, and forward northbound traffic (destined for RDA requester 106) from the remote device to cloud proxy 112. Session proxy 116 creates the forwarding rules in an initially inactive or dormant state in which the inactive/dormant first forwarding rules are unable to be used to forward any traffic.

At 211, once the forwarding rules have been created at network proxy 116, the network proxy waits for the authorized RDA session time window to start/begin, i.e., for a current time to match the start time of the session time window. This may occur relatively immediately when the forwarding rules are created, or may occur at a future time.

At 212, responsive to when the current time matches the start time, network proxy 116 sets-up or establishes WebSocket 130 to cloud proxy 112 through firewall 120, and the cloud proxy cooperates with the network proxy to establish the WebSocket, if such a WebSocket does not exist already. If a WebSocket already exists between the proxies 112 and 116, the existing WebSocket is used to signal the start of the session time window. In an example, WebSocket text frames are used to signal the start of the session time window, while binary frames are reserved for one or more TCP streams, each carrying an RDA session or other communication. Initiating a WebSocket connection from within/behind firewall 120 in customer network 104 is relatively easy (compared to, say, inbound SSH access or HTTPS access to a full-fledged proxy located within/behind the firewall); however, it does require outbound port 443 (HTTPS) access to cloud proxy 112 to be enabled as part of initial service enablement—this port opening does not, of itself, enable any incoming RDA sessions until WebSocket 130 has actually been established from within/behind firewall 120.

At 213, after establishing WebSocket 130, provided the current time is within the session time window, network proxy 116 transitions the dormant or inactive forwarding rules set up earlier (at 210) at the network proxy to an active state. Only when the forwarding rules have been activated at 213, RDA session forwarding at network proxy 116 based on the activated forwarding rules is performed by a session handler associated with the network proxy rather than a local TCP/IP stack. The session handler may use multiple threads, one for each RDA session. The session handler forwards traffic (i.e., data packets) between a channel on WebSocket 130 (identified by "session number") and the target/customer network. A "tun number" is selected and associated with the RDA request and the "session number" in the RDA request. This "tun number" identifies, for network proxy 116, WebSocket 130 to be used for the session. This may be an existing WebSocket, or one that will be created in the future. Network proxy 116 will, most likely, have at most one WebSocket connection to cloud proxy 112 at any time unlike cloud proxy 112, which may be associated with several network proxies.

At 214, after establishing WebSocket 130, provided the current time is within the session time window, cloud proxy 112 transitions the dormant forwarding rules set up earlier (at 208) at the cloud proxy to an active state. The forwarding rules, once activated at 214, operate as follows. An RDA session handler process (also referred to simply as a "session handler") hosted on cloud proxy 112 implements the activated forwarding rules as follows. Inputs from RDA requester 106 are intercepted at cloud proxy 112 by the session handler with worker threads created for each RDA session. The inputs from RDA requester 106 are forwarded to a channel within WebSocket 130 (established in operation 209) to network proxy 116. The RDA session is associated with a "session number" which is identical to a TCP port used as a source port on WebSocket 130 towards network proxy 116. The details of IP address and TCP port mapping are discussed further below in connection with FIG. 3. In addition to the "session number," a "tun number" (identifying WebSocket 130 to network proxy 116) is included in the forwarding rules. If WebSocket 130 to network proxy 116 does not already exist, then a new "tun number" is reserved for a future WebSocket to the network proxy. In conjunction with the "session number," the "tun number" ("tun" being Linux-speak for "tunnel") uniquely identifies the RDA session on the inter-proxy (i.e., between proxies 112 and 116) public network segment. If multiple RDA sessions are multiplexed on the same WebSocket, they are identified by different session numbers associated with the same "tun number."

At 215, cloud proxy 112 notifies RDA requester 106 of RDA access availability because the session time window has started, i.e., the start time has occurred and the session time window is still active. This can be an on-screen notification to RDA requester with a selectable option that also allows the RDA requester to initiate RDA access via the notification.

At 216a, RDA requester 106 initiates RDA access, for example, the user of RDA requester 106 selects to initiate RDA access via the on-screen notification, and also submits credentials of the user. The selection is communicated to cloud proxy 112, which receives the selection. Receipt of the selection results in operations 216b and 216c, discussed below.

At 216b, responsive to receiving the selection to initiate RDA access and the user credential from RDA requester 106, cloud proxy 112 requests AAA server 114 to check the entitlement of the RDA requester based on the user credentials. It is assumed here that AAA server 114 validates the entitlement to cloud proxy 112, so that initiation of RDA access may continue.

At 216c, responsive to validation of entitlement at 216b, cloud proxy 112 communicates RDA session launch to network proxy 116, which receives the communication.

At 216d, responsive to receiving the communication from 216c, network proxy 116 sends to remote device 118 a request for a login window (for HTTPS) or a command shell (for SSH).

At 217a, the remote device replies to network proxy 116 with the requested login window or command shell. At 217b, network proxy 116 forwards the reply from 217a to cloud proxy 112. At 217c, cloud proxy 112 forwards the reply to RDA requester 106 to be rendered in a browser hosted on the RDA requester.

For HTTPS-based device RDA access, operations 216a-216d and 217a-217c include HTTPS commands generated by the browser hosted on RDA requester 106 being forwarded to remote device 118 and the responses from the remote device being forwarded back to the RDA requester. For SSH-based device access, a browser script embedded in an RDA session launch webpage generates a web SSH window which is then mapped by the session handler in cloud proxy 112 into the actual SSH data streams carried over WebSocket 130 and over an actual SSH channel to remote device 118. Forwarding details for both HTTPS and SSH are described in further detail below.

At 218, RDA requester 106 logs into the remote device via a User Interface (UI) login window or the command shell. This creates a device login session that is not the same as the RDA session which is active for the session time window. Several device login sessions can exist serially during the lifetime of an RDA session. In other words, RDA requester 106 may log in and log out of the remote device several times while the RDA session exists. Although this is not required, the login credentials for the remote device can be the same regardless of whether the remote device is accessed from within customer network 104 or via an RDA procedure.

At 219, following successful login at 218, remote device access by RDA requester 106 follows the same general pattern as direct access from within customer network 104. RDA requester 106 executes commands and then logs off to finish the session. Commands and responses for both HTTPS and SSH access are carried as binary payloads over WebSocket 130. Each request (whether via HTTPS or SSH) is vetted by the session handler with respect to the user's entitlement (as done at 216b). Entitlement-checking each user action enables multitenancy by protecting the boundaries between the tenants of the SaaS-based RDA service. These tenants may belong to different companies, or to strictly policed roles within a company.

The RDA session, including the forwarding rules in cloud proxy 112 and network proxy 116, is retained until one of the following occurs:

1. RDA authorization times out;
2. RDA authorization is revoked by the network administration; and
3. RDA authorization is relinquished by RDA requester 106.

When this happens, the forwarding rules and TCP/IP port assignments are deleted from proxies 112 and 116. The signal flows for RDA session termination are similar to those for RDA session establishment and are, therefore, not shown for brevity. WebSocket 130 is not terminated if there are other concurrent RDA sessions. WebSocket 130 may be retained even if there are no other concurrent RDA sessions in order to expedite future RDA session establishment, for signaling between proxies 112 and 116, or for purposes other than RDA. The latter is true if proxies 112 and 116 are embedded in a wider services framework.

Overall, operations 201-219 represent a secure end-to-end procedure for establishing an authorized RDA path across the public Internet. Specifically, operations 208, 209 and 210 implement a unique, automated zero-touch mechanism to create and communicate session forwarding rules for an initially dormant access path across the Internet. Operations 211 through 217 implement a novel way to activate the access path and to establish an underlying WAN transport on the basis of an authorized schedule.

Only one RDA session from RDA requester 106 to remote device 118 is described above in connection with FIGS. 2A-2C; however, the embodiments presented herein support multiple RDA sessions to a remote device. These may be from the same RDA requestor or different RDA requesters, and may use the same or different protocols (e.g., SSH and HTTPS).

As described above, operations 208 and 210 automatically create forwarding rules in cloud proxy 112 and network proxy 116, respectively, for traffic/data packet forwarding and address mapping for RDA access via the cloud proxy and the network proxy. The forwarding rules enable a bidirectional path used in the end-to-end RDA flow. A process for creating the forwarding rules is now described, beginning with the easier case of creating forwarding rules for HTTPS-based access. Once the RDA path is available, cloud proxy 112 activates a URL that may be used by the browser hosted on the RDA requester 106 to send HTTPS requests to remote device 118. The net effect is that the chain of proxies 112 and 116 provides an HTTPS forwarding function that straddles disparate environments across the WAN of network 110.

An example of the above-mentioned URL may take the following form:
https://proxy-xxx.example.com/RDA/customer-yyy/device-zzz:443.

Following the path described by the URL, HTTPS requests sent to HTTPS port (443) of cloud proxy 112 are forwarded via the session handler (identified by string "RDA" in the URL) of the cloud proxy and via network proxy 116 (identified by string "customer-yyy" in the URL) to the HTTPS port (443) on remote device 118 (identified by string "device-zzz").

As described above, at operation 215, cloud proxy 112 notifies RDA requester 106 of RDA path availability and offers a graphic widget (e.g. a button) that may be selected (e.g., clicked) by the user of the RDA requester in operation 216a to launch the RDA session. Selecting/clicking the widget allows the browser hosted on RDA requester 106 to use the URL for accessing the remote device. The browser can continue to use this URL for subsequent HTTPS requests to remote device 118 for the lifetime of the RDA session in conformity with the UI exposed by the remote device.

Figure 3:
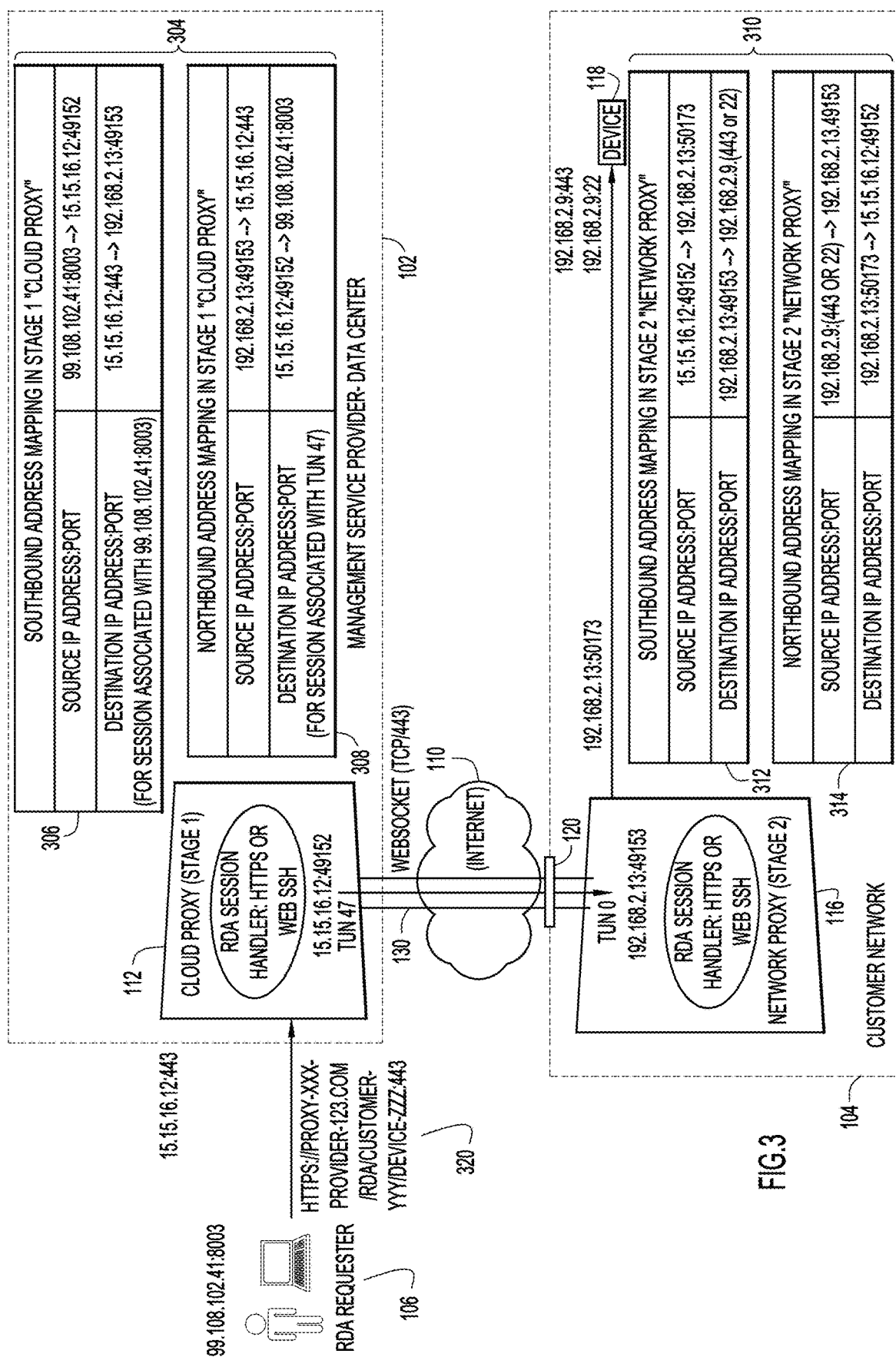
FIG. 3 is an illustration of session forwarding rules created in a cloud proxy and a network proxy of the network environment of FIG. 1, according to an example embodiment.

With reference to FIG. 3, there is an illustration of example forwarding rules created in cloud proxy 112 and network proxy 116, the above-mentioned URL, and various other example RDA path identifiers. The illustration shows first forwarding rules 304 created by and stored on cloud proxy 112 at operation 208. First forwarding rules 304 include southbound address mappings 306 that translate between source IP addresses and ports, and between destination IP addresses and ports for forwarding southbound traffic. First forwarding rules 304 also include northbound address mappings 308 that translate between source IP addresses and ports, and between destination IP addresses and ports for forwarding northbound traffic.

The illustration of FIG. 3 also shows second forwarding rules 310 created by and stored on network proxy 116 at operation 210. Second forward rules 310 include southbound address mappings 312 that translate between source IP addresses and ports, and between destination IP addresses and ports for forwarding southbound traffic. Second forwarding rules 310 also include northbound address mappings 314 that translate between source IP addresses and ports, and between destination IP addresses and ports for forwarding northbound traffic. The above-mentioned URL is also shown at 320. URL 320 points to remote device 118 in customer network 104) via the proxy chain including proxies 112 and 116, and is mapped at operation 218 into a channel on a "tun" (Linux-speak for 'tunnel') interface. The tun number identifies WebSocket 130, and channelization allows multiple sessions to be carried concurrently via the WebSocket. The channel is identified by the session number, which is identical to the TCP port used as the source port on WebSocket 130 towards network proxy 116. Channels on the WebSocket are assigned ephemeral TCP ports starting from 49152. This port space is constrained to within single WebSocket 130, and is completely disjoint with and independent of port usage in adjacent domains, such as in data center 102, customer network 104, or any other WebSocket on proxies 112 and 116, thus obviating a need for any resolution of port assignment conflict with the adjacent domains. For the sake of simplicity, it is proposed to use even numbered ephemeral ports starting from 49152 as source ports in southbound packets (from cloud proxy 112 to network proxy 116), with each port that is used representing a "channel" dedicated to an RDA session. Conversely, it is proposed to use odd-numbered ephemeral TCP ports starting from 49153 as destination ports in southbound packets. Paired adjacent ports, e.g., 49152 and 49153, represent source and destination ports of southbound packets, respectively. In northbound packets, the aforementioned usage is reversed with 49152 being the destination port and 49153 being the source port. The next RDA channel will be assigned an intra-WebSocket TCP port pair of 49154 and 49155. As described above, this port assignment is derived from/based on the session number communicated by cloud proxy 112 to network proxy 116 via signaling at operation 209. Note that any other algorithmic method of assigning port numbers can used. Also, ports no longer used are to be returned to the pool of unused port numbers in order to avoid port resource starvation.

With continued reference to FIG. 3, HTTPS requests are received by cloud proxy 112 from logged-in RDA requester 106 with a source IP address and a port of 99.108.102.41: 8003. A session marker, such as an OBSSO cookie or an OAuth token, may be used in addition to the source IP address:port for mapping a request into a "session" (which may be a dedicated process or a thread in a generic session handler process). The "session" process/thread forwards each HTTPs request, after entitlement checks and URL translation, into "tun interface" 47 and into the channel with a session number of 49152. The "tun interface" number is chosen arbitrarily in this example. A session number of 49152 means that the requests are sent down WebSocket 130 with a source port of 49152 and a destination port of 49153.

Forwarding is at the session level (i.e., OSI layer 5) and is not a form of TCP port forwarding; it does not use the local TCP/IP stack. A "session" (process or thread) mediates between the external network and WebSocket 130. A packet from an external network (e.g., network 110) may be associated with a session on the basis of a valid user login that is mapped into a marker such as an OBSSO cookie or an OAuth token in each HTTPS request. The use of IP addresses and ports within WebSocket connection 130 is an ancillary part of the forwarding rule rather than its basis. Since the "address and port space" within WebSocket 130 is defined to be disjoint from other such spaces, the use of IP addresses and ports on the WebSocket is arbitrary as long as the correct mappings are created at both ends of the WebSocket. In this example, network proxy 116 is identified within WebSocket 130 by its actual private IP address (192.168.2.13) within customer network 116. Similarly, cloud proxy 112 is identified by its actual public IP address of 15.15.16.12. Similarly, ports 49152 and 49153 as used within WebSocket 130 are not part of the port space associated with the IP address of network proxy 116 in target/customer network 104, nor are they part of the port space associated with the IP address of cloud proxy 112 (which is a public IP address in the example). There is no address or port conflict between what is internal to WebSocket 130 and what is external to it since forwarding is done at a higher, session level.

As in the case of cloud proxy 112, forwarding at network proxy 116 is at the session level (OSI layer 5) and is not a form of TCP port forwarding. It does not use the local TCP/IP stack. A "session" (process or thread) mediates between the external network (e.g., network 110) and WebSocket 130. In the case of multiple concurrent sessions on WebSocket 130, each session is identified by a session number which, as described above, is mapped into the TCP ports that pertain to the packets carried via the WebSocket. In this example, at operation 210 described above, WebSocket 130 is assigned a "tun interface" number of 0 at network proxy 116 (reflecting the fact that the network proxy might host just one WebSocket). The forwarding rule at the network proxy calls for the forwarding of packets received on tun 0 with a source port of 49152 to port 443 on remote device 118 with an IP address of 192.168.2.9. This is the only information needed for forwarding. Source and destination IP address mapping, which is secondary to the forwarding process, is shown in FIG. 3 and is a corollary of the corresponding address mapping rule at network proxy 116. For TCP/IP packets forwarded towards remote device 118, the source IP address and port are 192.168.2.13 (referring to network proxy 116) and 50173, respectively. Note that the source port of 50173 is chosen by network proxy 116 and is unconstrained by the above-described processes.

The forwarding of HTTPS responses is the converse of this rule. At network proxy 116, responses received from remote device 118 on destination port 50173 are forwarded on tun 0 with a source port of 49153 and a destination port of 49152 (which is defined to be the session number). Note that, in this example, tun 0 at network proxy 116 corresponds to tun 47 at cloud proxy 112. At cloud proxy 112, responses received on tun 47 with a destination port of 49152 are forwarded by the session handler to the IP address and port (99.108.102.41 and 8003) that sourced the RDA request.

For SSH access, as opposed to HTTPS access described above, the RDA session launch webpage hosted by cloud proxy 112 spawns a web-based SSH client (as described above). The web-based SSH client generates, e.g., asynchronous JavaScript and XML (AJAX)/JavaScript Object Notation (JSON), artifacts that are intercepted by the session handler in cloud proxy 112. The session handler, in turn, emulates a normal SSH client towards remote device 118. The SSH streams generated by the session handler are forwarded via network proxy 116 in a manner similar to that for HTTPS forwarding with the difference that the destination port used by the network proxy towards the remote device is 22 rather than 443.

In both cases (HTTPS and SSH), the method of OSI layer 5 session forwarding and transitive, ephemeral address/port mapping across the WAN is unique. Without requiring labor-intensive cross-organizational provisioning, it gives the firewalled device (e.g., remote device 118) a URL-based accessible and yet protected presence in the Internet. This capability of automated, on-demand provisioning of device access is limited to authorized users and support personnel, within tight temporal constraints. It allows flawless forwarding and multiplexing of remote device access, while totally precluding any packet leakage that could have resulted from using TCP/IP routing across potentially conflicting address domains separated by a Network Address Translation (NAT) operation.

This session forwarding scheme protects against attacks in the following manner. By providing session-level mediation rather than exposing a TCP/IP address and port that is directly mapped to an address and port on the end device. This allows easier vetting (e.g. using a session cookie or an OAuth token) of each request against the user's entitlement. Exposing a port-mapped TCP/IP session allows anyone who can spoof a source IP address unchecked access to all the end devices that that the real owner of the IP address is entitled to. By allowing the use of a DNS-resolvable host name for selecting the end device rather than its IP address within the target network, even though the latter is also possible.

Figure 4:
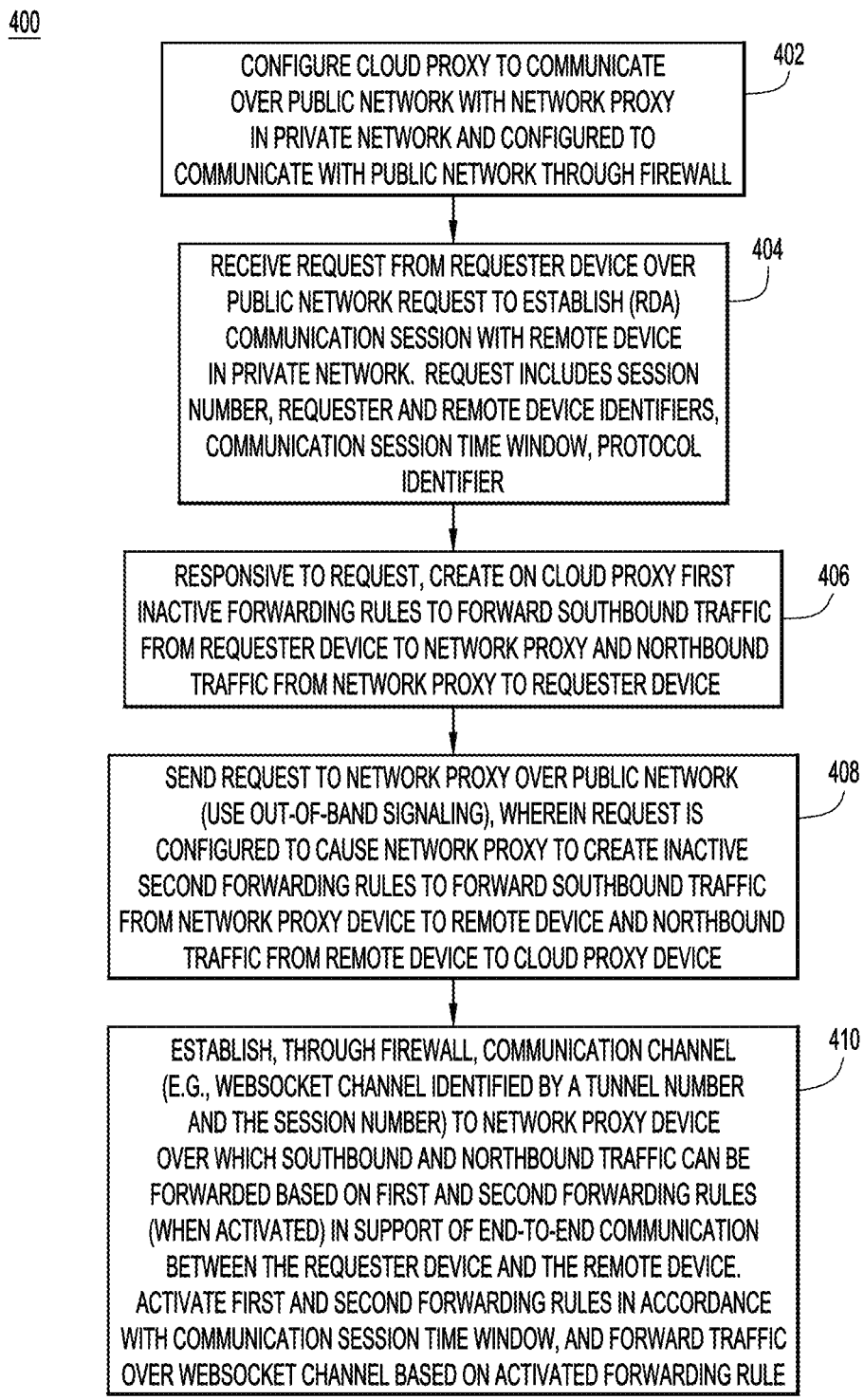
FIG. 4 is a flowchart of a high-level method of establishing the RDA session that includes some of the operations described in connection with FIGS. 2 and 3, according to an example embodiment.

With reference to FIG. 4, there is a high-level flowchart of an example method 400 of RDA access according to embodiments presented herein. Method 400 includes various operations described above in connection with FIGS. 1-3.

At 402, cloud proxy 112 is configured to communicate over (public) communication network 110, including the Internet, with network proxy 116 in customer/private network 104. Network proxy 116 is configured to communicate with communication network 110 through firewall 120.

At 404, cloud proxy 112 receives from RDA requester 106 (also referred to as a "requester device") over network 110 an RDA request to establish an RDA communication session with remote device 118 in customer network 104. The request includes request parameters as described above in connection with operation 204, such as a session number, identifiers of RDA requester 106 and remote device 118, a session time window, and identification of a communication protocol to be used for the access.

At 406, responsive to the request, cloud proxy 112 creates and stores first forwarding rules to be used during the communication session to forward southbound traffic from RDA requester 106 to network proxy 116 and northbound traffic from the network proxy to the RDA requester. The first forwarding rules are initially inactive.

At 408, cloud proxy 112 sends the request to network proxy 116 over network 110, via signaling, which may be out-of-band such as secure email, instant message (IM), HTTPS messages and the like—or inband via WebSocket text frames, if WebSocket exists. The request, when received at network proxy 116, causes the network proxy to create and store second forwarding rules to forward the southbound traffic from the network proxy to remote device 118 and the northbound traffic from the remote device to cloud proxy 112. The second forwarding rules are initially inactive.

At 410, cloud proxy 112, cooperating with network proxy 116, establishes, through firewall 120, a communication channel to the network proxy device over which the southbound and the northbound traffic can be forwarded based on the forwarding rules (once they have been activated) in support of end-to-end communication between RDA requester 106 and remote device 118. To do this, cloud proxy 112 receives a request from network proxy 116 through firewall 120 for a WebSocket. This results in cloud proxy 112 and network proxy 116 setting-up WebSocket 130 linking the cloud proxy to the network proxy, if such a WebSocket does not already exist. WebSocket 130 is identified at cloud proxy 112 and at network proxy 116 by a first tunnel number and a second tunnel number, respectively. Also, the communication channel/tunnel is a WebSocket channel identified at cloud proxy 112 and at network proxy 116 based on the session number. Thus, respective tuples <tunnel number, session number> uniquely identify the WebSocket channel at cloud proxy 112 and network proxy 116. Once WebSocket 130 is established, cloud proxy 112 and network proxy 116 activate the first forwarding rules and the second forwarding rules, respectively, at the appropriate time, i.e., when the session time window starts, and the proxies forward traffic over the WebSocket channel based on the activated forwarding rules.

Figure 5:
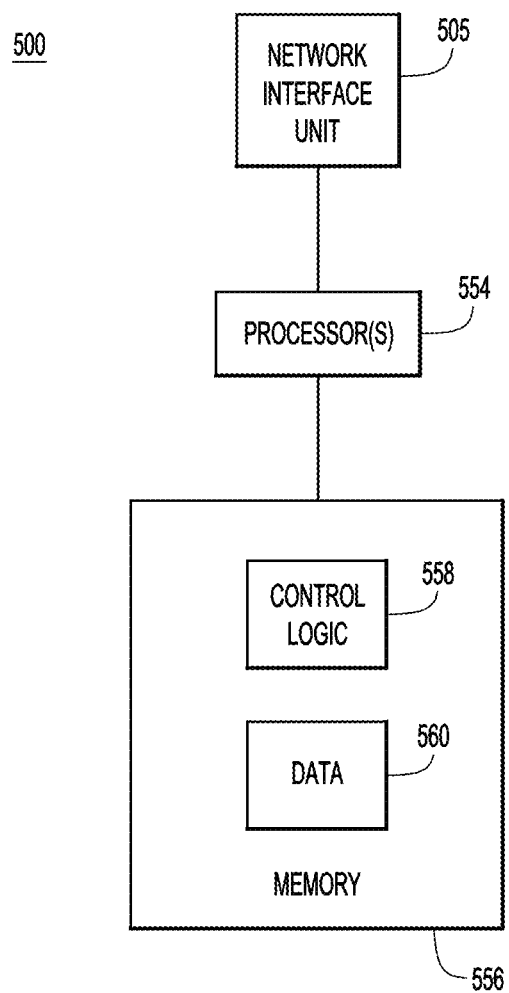
FIG. 5 is a block diagram of a computer device for hosting the cloud proxy or the network proxy, according to an example embodiment.

With reference to FIG. 5, there is a block diagram of an example computer device 500, such as a server device, for hosting cloud proxy 112. Computer device 500 may also host network proxy 116. Computer device 500 includes network interface unit 505 to communicate with a wired and/or wireless communication network. Computer device 500 also includes a processor 554 (or multiple processors, which may be implemented as software or hardware processors), and memory 556. Network interface unit 505 may include an Ethernet card with a port (or multiple such devices) to communicate over wired Ethernet links and/or a wireless communication card with a wireless transceiver to communicate over wireless links.

Memory 556 stores instructions for implementing methods described herein. Memory 556 may include read only memory (ROM), random access memory (RAM), magnetic disk storage media devices, optical storage media devices, flash memory devices, electrical, optical, or other physical/tangible (non-transitory) memory storage devices. The processor 554 is, for example, a microprocessor or a microcontroller that executes instructions stored in memory. Thus, in general, the memory 556 may comprise one or more tangible computer readable storage media (e.g., a memory device) encoded with software comprising computer executable instructions and when the software is executed (by the processor 554) it is operable to perform the operations described herein. For example, memory 556 stores control logic 558 to perform operations of cloud proxy 112 (including the session handler) (or network proxy 116). The memory 556 may also store data 560 used and generated by logic 558. For example, data 560 stores forwarding rules, RDA request parameters, computer device identities, and so on.

Figure 6:
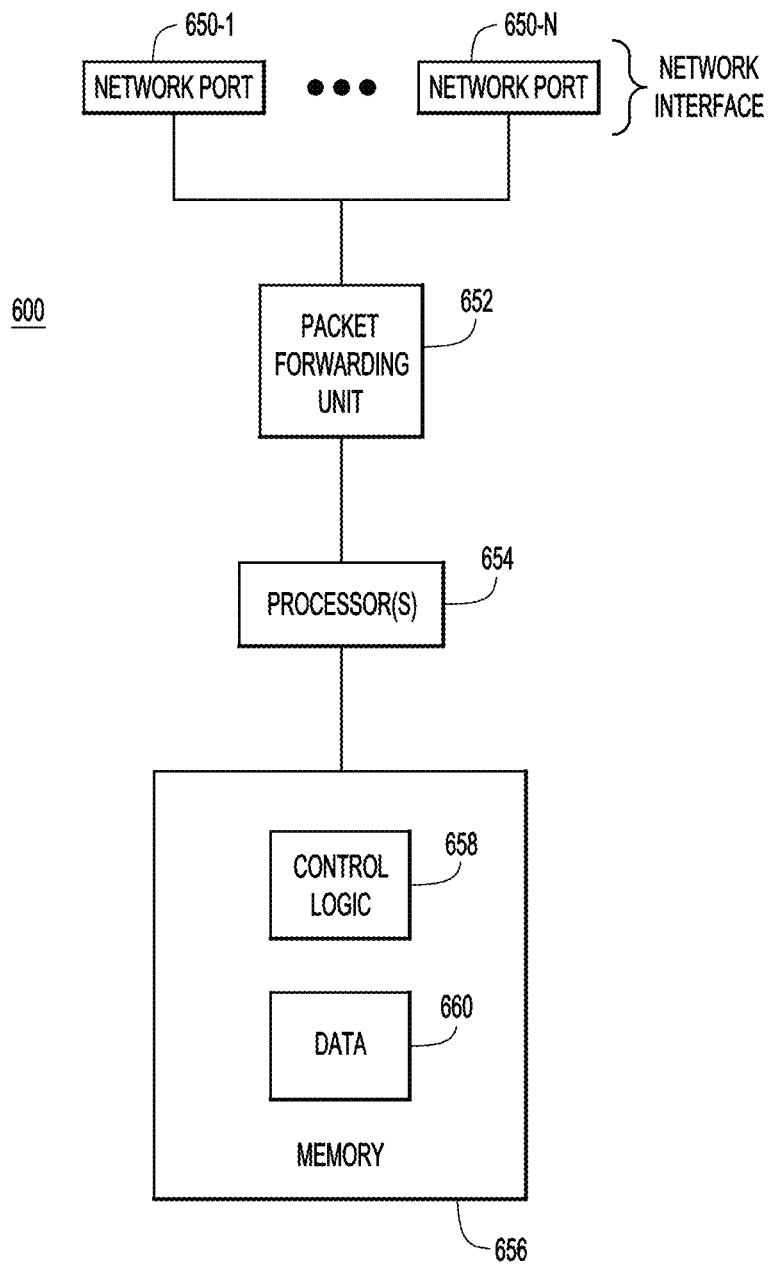
FIG. 6 is a block diagram of a network device for hosting the cloud proxy or the network proxy, according to an example embodiment.

With reference to FIG. 6, there is a block diagram of an example network device 600 configured to host/perform the operations of network proxy 116. Network device 600 may also host/perform the operations of cloud proxy 112. Network device 600 may represent a network router, a network switch, and the like. Device 600 may include a plurality of network ports 650-1 through 650-N, a packet forwarding unit or switch fabric 652 to perform routing/switching between the ports, a processor 654 (or multiple processors), and memory 656.

The memory 656 may comprise read only memory (ROM), random access memory (RAM), magnetic disk storage media devices, or other physical/tangible (non-transitory) memory storage devices. The processor 654 executes instructions stored in memory. Thus, in general, the memory 656 may comprise one or more tangible computer readable storage media (e.g., a memory device) encoded with software comprising computer executable instructions and when the software is executed (by the processor 654) it is operable to perform the operations of network proxy 116 (or cloud proxy 112) described herein. The memory may also store data 660 used and generated by control logic 658. For example, data 660 stores forwarding rules, RDA request parameters, computer identities, and so on.

In summary, embodiments presented herein are directed to a low-touch, cloud-hosted RDA SaaS provided via a two-stage session proxy. The first proxy stage, i.e., cloud proxy, which is located in the cloud, is associated with one or more second stage proxies, i.e., network proxies, located within customer/target networks. These two proxies provide forwarding of HTTPS and SSH sessions over the public Internet via a WebSocket initiated on demand by the second stage proxy in response to out-of-band signaling (e.g. via secure email) or inband signaling (e.g. via text frames over an existing WebSocket tunnel) from the first stage proxy. Device access is authorized by a network administrator and can be revoked in real-time. Access rules for both proxy stages are generated automatically and are kept only for the duration of the RDA session. The embodiments provide a unique scheme used for session forwarding and for assigning TCP/IP ports, and in the overall procedure for authorizing and signaling the RDA forwarding set-up across proxy stages located in different environments (e.g. service provider and customer). Business utility lies in the absence of manual set-up steps (with the exception of network administration authorization where necessary), and in the offering of RDA as a highly scalable, multi-tenant, SaaS service with reduced infrastructure and operational cost. There may be multiple RDA sessions to a remote device. These may be from the same user or from different users, and may use the same or different protocols (SSH and HTTPS being the candidate protocols under consideration).

Advantageously, one or more of the embodiments presented herein allow quick, low-touch, on-demand RDA to be provisioned over the public Internet without manually configuring proxies or firewalls. The proxies are auto-configured and no new firewall pinholes are needed. Auto-configuration allows massive scalability. These embodiments support secure, dynamic, revocable, non-repudiable RDA authorization by network owner. Security is enhanced by limiting RDA to the confines of time-bound, policy-governed, entitlement-checked, authentication-protected sessions within customer-initiated WebSocket connections. The proxy settings last only while RDA authorization lasts, and therefore RDA access is more secure. These settings are created afresh for each new RDA authorization. Economies of scale for infrastructure and operational costs are provided via a shared, multi-tenant RDA proxy SaaS service. Small customers need only have a small footprint "network proxy", which is a "jump server" agent. Where applicable, this may be bundled with other agents such as those for data acquisition and for configuration management. The scheme for cloud-hosted, human-centric RDA can be easily extended to machine-to-machine access across network boundaries such that cloud-based SaaS applications can directly access firewalled devices on demand without setting up a permanent VPN.

In summary, in one form, a system is provided in which a cloud proxy device is configured to communicate over a public network with a network proxy device in a private network. The network proxy is configured to communicate with the cloud proxy via the public network through a firewall device. The cloud proxy device receives from a requester device over the public network a request to establish a bidirectional communication session with a remote device in the private network. The request includes identifiers for the requester device and the remote device. Responsive to the request, the cloud proxy device creates on the cloud proxy device first forwarding rules to be used during the communication session to forward southbound traffic from the requester device to the network proxy device and northbound traffic from the network proxy device to the requester device. The cloud proxy device sends the request to the network proxy device over the public network. The request is configured to cause the network proxy device to schedule the time of session start, and to create second forwarding rules to forward the southbound traffic from the network proxy device to the remote device and the northbound traffic from the remote device to the cloud proxy device. The network proxy establishes, through the firewall device, a tunnel to the cloud proxy if such a tunnel does not exist. Also, at the scheduled time of session start, the first and second forwarding rules are activated to create, through this tunnel, a bidirectional channel between the proxies over which the southbound traffic to the remote device and northbound traffic from the remote device are forwarded.

In another form, a method is provided comprising: at a cloud proxy device configured to communicate over a public network with a network proxy device in a private network, the network proxy device configured to communicate with the public network through a firewall device: receiving from a requester device over the public network a request to establish a bidirectional communication session with a remote device in the private network, the request including identifiers for the requester device and the remote device; responsive to the request, creating on the cloud proxy device first forwarding rules to be used during the communication session to forward southbound traffic from the requester device to the network proxy device and northbound traffic from the network proxy device to the requester device; sending the request to the network proxy device over the public network, wherein the request is configured to cause the network proxy device to create second forwarding rules to forward the southbound traffic from the network proxy device to the remote device and the northbound traffic from the remote device to the cloud proxy device; and establishing, through the firewall device, a communication tunnel with the network proxy device over which the southbound traffic and the northbound traffic are forwarded based on the first forwarding rules and the second forwarding rules in support of end-to-end communication between the requester device and the remote device.

In yet another form, an apparatus is provided comprising: a network interface unit; and a processor of a cloud proxy device, the processor coupled to the network interface unit and configured to communicate over a public network with a network proxy device in a private network via the network interface unit, the network proxy device configured to communicate with the public network through a firewall device, the processor further configured to: receive from a requester device over the public network a request to establish a bidirectional communication session with a remote device in the private network, the request including identifiers for the requester device and the remote device; responsive to the request, create on the cloud proxy device first forwarding rules to be used during the communication session to forward southbound traffic from the requester device to the network proxy device and northbound traffic from the network proxy device to the requester device; send the request to the network proxy device over the public network, wherein the request is configured to cause the network proxy device to create second forwarding rules to forward the southbound traffic from the network proxy device to the remote device and the northbound traffic from the remote device to the cloud proxy device; and establish, through the firewall device, a communication tunnel with the network proxy device over which the southbound traffic and the northbound traffic are forwarded based on the forwarding rules in support of end-to-end communication between the requester device and the remote device.

In another form, a non-transitory computer readable medium encoded with instructions is provided. The instructions, when executed by a processor of a cloud proxy device configured to communicate over a public network with a network proxy device in a private network, the network proxy device configured to communicate with the public network through a firewall device, cause the processor to perform operations including: receiving from a requester device over the public network a request to establish a bidirectional communication session with a remote device in the private network, the request including identifiers for the requester device and the remote device; responsive to the request, creating on the cloud proxy device first forwarding rules to be used during the communication session to forward southbound traffic from the requester device to the network proxy device and northbound traffic from the network proxy device to the requester device; sending the request to the network proxy device over the public network, wherein the request is configured to cause the network proxy device to create second forwarding rules to forward the southbound traffic from the network proxy device to the remote device and the northbound traffic from the remote device to the cloud proxy device; and establishing, through the firewall device, a communication tunnel with the network proxy device over which the southbound traffic and the northbound traffic are forwarded based on the forwarding rules in support of end-to-end communication between the requester device and the remote device.

The above description is intended by way of example only. Various modifications and structural changes may be made therein without departing from the scope of the concepts described herein and within the scope and range of equivalents of the claims.

What is claimed is:

1. A method comprising:
    at a cloud proxy device configured to communicate over a public network with a network proxy device in a private network, the network proxy device configured to communicate with the public network through a firewall device:
    receiving from a requester device over the public network a request to establish a bidirectional communication session with a remote device in the private network, the request including identifiers for the requester device and the remote device, and a communication session time window having a start time and a stop time;
    responsive to the request, creating on the cloud proxy device first forwarding rules to be used during the communication session to forward southbound traffic from the requester device to the network proxy device and northbound traffic from the network proxy device to the requester device;
    sending the request to the network proxy device over the public network, wherein the request is configured to cause the network proxy device to create second forwarding rules to forward the southbound traffic from the network proxy device to the remote device and the northbound traffic from the remote device to the cloud proxy device;
    establishing, through the firewall device, a communication tunnel with the network proxy device over which the southbound traffic and the northbound traffic are forwarded based on the first forwarding rules and the second forwarding rules in support of end-to-end communication between the requester device and the remote device;
    when the start time occurs, notifying the requester device that the communication session has started;
    receiving from the requester device a request to initiate access to the remote device;
    checking an entitlement of the requester device to attend the communication session and forwarding to the network proxy device the request to initiate access for subsequent forwarding by the network proxy device to the remote device;
    receiving from the network proxy device a user login prompt for the communication session that was forwarded from the remote device to the network proxy device; and
    forwarding the user login prompt to the requester device for display at the requester device.

2. The method of claim 1, wherein the request to establish the communication session includes a session number identifying the communication session, and wherein the establishing includes, at the cloud proxy device:
    setting-up as the communication tunnel a Web Socket linking the cloud proxy device to the network proxy device if one does not already exist, wherein the WebSocket is identified at the cloud proxy device and at the network proxy device by a first tunnel number and a second tunnel number, respectively; and
    setting-up a channel within the Web Socket identified at the cloud proxy device and at the network proxy device based on the session number.

3. The method of claim 2, further comprising, at the cloud proxy device:
    receiving from the network proxy device through the firewall device, a request to setup the Web Socket; and
    upon receiving the request to setup the Web Socket, setting-up the Web Socket and the channel within the Web Socket through the network proxy device.

4. The method of claim 3, further comprising, at the network proxy device:

when the start time occurs, sending to the cloud proxy device, through the firewall device, the request to setup the Web Socket.

5. The method of claim 4, wherein:
the creating the first forwarding rules includes creating the first forwarding rules in an initially inactive state in which the inactive first forwarding rules are unable to be used to forward any traffic;
the second forwarding rules are created in an initially inactive state in which the inactive second forwarding rules are unable to be used to forward any traffic; and
the method further comprises, once the WebSocket is setup, activating the first forwarding rules and the second forwarding rules during the communication session time window, during which activated first forwarding rules and activated second forwarding rules are used to forward the traffic over the channel within the WebSocket.

6. The method of claim 2, wherein:
the cloud proxy device is identified within the WebSocket by a public Internet Protocol (IP) address;
the network proxy device is identified within the WebSocket by a private IP address of the private network; and
the network proxy device and the cloud proxy device identify the channel within the Web Socket using a session number.

7. The method of claim 6, wherein the session number is mapped into a first Transmission Control (TCP) port for a first direction of communication over the channel within the Web Socket and a second TCP port for a second direction of communication over the channel within the Web Socket.

8. The method of claim 1, further comprising, at the cloud proxy device, prior to the receiving the request to establish the communication session:
receiving from the requester device an initial request including a user identifier; and
in response to receiving the initial request, authenticating the user identifier and, if the user identifier is authenticated successfully, accessing a list of remote devices of the private network with which the requester device is authorized to communicate, and sending the list to the requester device.

9. The method of claim 8, wherein the request to establish the communication session further includes an identifier of a communication protocol to be used during the communication session, the method further comprising, at the cloud proxy device, responsive to the receiving the request to establish the communication session:
sending the request, with an identifier of the cloud proxy device, to a grantor device configured to authorize the request;
receiving from the grantor device a positive authorization of the request; and
authenticating the grantor device and, if the grantor device is successfully authenticated, creating the first forwarding rules.

10. The method of claim 1,
wherein the notifying includes notifying the requester device that the communication session has started to enable the requester device to initiate access to the remote device.

11. The method of claim 1, wherein the sending the request includes sending the request to the network proxy device over the public network using in-band signaling over a Web Socket or secure-out-of band signaling that is not over a Web Socket.

12. An apparatus comprising:
a network interface unit; and
a processor of a cloud proxy device, the processor coupled to the network interface unit and configured to communicate over a public network with a network proxy device in a private network via the network interface unit, the network proxy device configured to communicate with the public network through a firewall device, the processor further configured to:
receive from a requester device over the public network a request to establish a bidirectional communication session with a remote device in the private network, the request including identifiers for the requester device and the remote device, and a communication session time window having a start time and a stop time;
responsive to the request, create on the cloud proxy device first forwarding rules to be used during the communication session to forward southbound traffic from the requester device to the network proxy device and northbound traffic from the network proxy device to the requester device;
send the request to the network proxy device over the public network, wherein the request is configured to cause the network proxy device to create second forwarding rules to forward the southbound traffic from the network proxy device to the remote device and the northbound traffic from the remote device to the cloud proxy device;
establish, through the firewall device, a communication tunnel with the network proxy device over which the southbound traffic and the northbound traffic are forwarded based on the first forwarding rules and the second forwarding rules in support of end-to-end communication between the requester device and the remote device;
when the start time occurs, notify the requester device that the communication session has started;
receive from the requester device a request to initiate access to the remote device;
check an entitlement of the requester device to attend the communication session and forwarding to the network proxy device the request to initiate access for subsequent forwarding by the network proxy device to the remote device;
receive from the network proxy device a user login prompt for the communication session that was forwarded from the remote device to the network proxy device; and
forward the user login prompt to the requester device for display at the requester device.

13. The apparatus of claim 12, wherein the request to establish the communication session includes a session number identifying the communication session, and wherein the processor is configured to establish by:
setting-up as the communication tunnel a Web Socket linking the cloud proxy device to the network proxy device if one does not already exist, wherein the WebSocket is identified at the cloud proxy device and at the network proxy device by a first tunnel number and a second tunnel number, respectively; and
setting-up a channel within the Web Socket identified at the cloud proxy device and at the network proxy device based on the session number.

14. The apparatus of claim 13, wherein the processor is configured to:

create the first forwarding rules by creating the first forwarding rules in an initially inactive state in which the inactive first forwarding rules are unable to be used to forward any traffic; and once the Web Socket is setup, activate the first forwarding rules during the communication session time window, during which the activated first forwarding rules are used to forward the traffic over the channel within the Web Socket.

15. The apparatus of claim 13, wherein:

the cloud proxy device is identified within the WebSocket by a public Internet Protocol (IP) address;

the network proxy device is identified within the Web-Socket by a private IP address of the private network; and the network proxy device and the cloud proxy device identify the channel within the Web Socket using a session number.

16. The apparatus of claim 15, wherein the session number is mapped into a first Transmisssion Control (TCP) port for a first direction of communication over the channel within the Web Socket and a second TCP port for a second direction of communication over the channel within the Web Socket.

17. A non-transitory computer readable medium encoded with instructions, that when executed by a processor of a cloud proxy device configured to communicate over a public network with a network proxy device in a private network, the network proxy device configured to communicate with the public network through a firewall device, cause the processor to perform operations including:

receiving from a requester device over the public network a request to establish a bidirectional communication session with a remote device in the private network, the request including identifiers for the requester device and the remote device, and a communication session time window having a start time and a stop time;

responsive to the request, creating on the cloud proxy device first forwarding rules to be used during the communication session to forward southbound traffic from the requester device to the network proxy device and northbound traffic from the network proxy device to the requester device;

sending the request to the network proxy device over the public network, wherein the request is configured to cause the network proxy device to create second forwarding rules to forward the southbound traffic from the network proxy device to the remote device and the northbound traffic from the remote device to the cloud proxy device;

establishing, through the firewall device, a communication tunnel with the network proxy device over which the southbound traffic and the northbound traffic are forwarded based on the first forwarding rules and the second forwarding rules in support of end-to-end communication between the requester device and the remote device; and when the start time occurs, notifying the requester device that the communication session has started;

receiving from the requester device a request to initiate access to the remote device;

checking an entitlement of the requester device to attend the communication session and forwarding to the network proxy device the request to initiate access for subsequent forwarding by the network proxy device to the remote device;

receiving from the network proxy device a user login prompt for the communication session that was forwarded from the remote device to the network proxy device; and forwarding the user login prompt to the requester device for display at the requester device.

18. The non-transitory computer readable medium of claim 17, wherein the request to establish the communication session includes a session number identifying the communication session, and wherein the instructions to cause the processor to perform the establishing include instructions to cause the processor to perform operations including:

setting-up as the communication tunnel a Web Socket linking the cloud proxy device to the network proxy device if one does not already exist, wherein the WebSocket is identified at the cloud proxy device and at the network proxy device by a first tunnel number and a second tunnel number, respectively; and setting-up a channel within the Web Socket identified at the cloud proxy device and at the network proxy device based on the session number.

19. The non-transitory computer readable medium of claim 18, wherein the instructions to cause the processor to perform the creating the first forwarding rules include instructions to cause the processor to perform creating the first forwarding rules in an initially inactive state in which the inactive first forwarding rules are unable to be used to forward any traffic, and, once the WebSocket is setup, activating the first forwarding rules during the communication session time window, during which the activated first forwarding rules are used to forward the traffic over the channel within the Web Socket.

20. The non-transitory computer readable medium of claim 18, wherein:

the cloud proxy device is identified within the WebSocket by a public Internet Protocol (IP) address;

the network proxy device is identified within the Web-Socket by a private IP address of the private network; and the network proxy device and the cloud proxy device identify the channel within the Web Socket using a session number.

* * * * *